US012466697B2

(12) United States Patent
Roberts et al.

(10) Patent No.: US 12,466,697 B2
(45) Date of Patent: Nov. 11, 2025

(54) ROPELESS ELEVATOR ROBOTIC TRANSPORTERS FOR VEHICLE PARKING

(71) Applicant: Otis Elevator Company, Farmington, CT (US)

(72) Inventors: Randy Roberts, Hebron, CT (US); Kiron Bhaskar, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1480 days.

(21) Appl. No.: 17/000,604

(22) Filed: Aug. 24, 2020

(65) Prior Publication Data

US 2022/0055863 A1 Feb. 24, 2022

(51) Int. Cl.

| | |
|---|---|
| ***B66B 7/04*** | (2006.01) |
| ***B66B 9/00*** | (2006.01) |
| ***B66B 9/16*** | (2006.01) |
| ***B66B 11/00*** | (2006.01) |
| ***B66B 11/04*** | (2006.01) |

(52) U.S. Cl.

CPC .............. *B66B 7/046* (2013.01); *B66B 9/003* (2013.01); *B66B 9/16* (2013.01); *B66B 11/006* (2013.01); *B66B 11/0407* (2013.01)

(58) Field of Classification Search

CPC ........... B66B 7/046; B66B 9/003; B66B 9/16; B66B 11/006; B66B 11/0407; B66B 9/02; B66B 11/005; B66B 11/0438; B66B 7/02; B66B 11/043; B25J 5/007; B25J 5/02

See application file for complete search history.

(56) References Cited

U.S. PATENT DOCUMENTS

| | | | | |
|---|---|---|---|---|
| 9,884,744 | B2 * | 2/2018 | Witczak | B66B 19/005 |
| 11,584,621 | B2 * | 2/2023 | Bhaskar | B66B 11/005 |
| 2017/0036889 | A1 | 2/2017 | Ericson | |
| 2019/0077636 | A1 | 3/2019 | Bhaskar | |
| 2022/0033217 | A1 * | 2/2022 | Roberts | B66B 5/0031 |
| 2022/0033221 | A1 * | 2/2022 | Roberts | B66B 9/003 |
| 2022/0033229 | A1 * | 2/2022 | Roberts | B66B 19/002 |
| 2022/0048729 | A1 * | 2/2022 | Roberts | B66B 9/02 |
| 2022/0055865 | A1 * | 2/2022 | Roberts | B66B 9/02 |

OTHER PUBLICATIONS

European Search Report for Application No. 2119291.6; Issued Jan. 13, 2022; 8 Pages.

* cited by examiner

*Primary Examiner* — Jeffrey Donels
(74) *Attorney, Agent, or Firm* — CANTOR COLBURN LLP

(57) ABSTRACT

A robotic transporter system for elevator cars including: a propulsion system configured to move an elevator car through an elevator shaft; and a robotic transporter configured to move the elevator car within a parking area, the robotic transporter including: an elevator containment slot to receive the elevator car and the propulsion system of the elevator car when the elevator containment slot is aligned with the elevator shaft.

17 Claims, 3 Drawing Sheets

ROPELESS ELEVATOR ROBOTIC TRANSPORTERS FOR VEHICLE PARKING

BACKGROUND

The subject matter disclosed herein relates generally to the field of elevator systems, and specifically to a method and apparatus for moving elevator cars from an elevator shaft to a parking area.

Elevator cars are conventionally operated by ropes and counter weights, which typically only allow one elevator car in an elevator shaft at a single time. Ropeless elevator systems may allow for more than one elevator car in the elevator shaft at a single time.

BRIEF SUMMARY

According to an embodiment, a robotic transporter system for elevator cars is provided. The robotic transporter system including: a propulsion system configured to move an elevator car through an elevator shaft; and a robotic transporter configured to move the elevator car within a parking area, the robotic transporter including: an elevator containment slot to receive the elevator car and the propulsion system of the elevator car when the elevator containment slot is aligned with the elevator shaft.

In addition to one or more of the features described herein, or as an alternative, further embodiments may include that the robotic transporter further includes: a propulsive system and wheels.

In addition to one or more of the features described herein, or as an alternative, further embodiments may include that the robotic transporter is configured to move along an X-axis and a Y-axis perpendicular to the X-axis In addition to one or more of the features described herein, or as an alternative, further embodiments may include a first guide beam that extends vertically through the elevator shaft, the first guide beam including a first surface and a second surface opposite the first surface, wherein the propulsion system is a beam climber system including: a first wheel in contact with the first surface; and a first electric motor configured to rotate the first wheel.

In addition to one or more of the features described herein, or as an alternative, further embodiments may include that the elevator containment slot further includes: a first containment slot guide beam configured to align with the first guide beam.

In addition to one or more of the features described herein, or as an alternative, further embodiments may include a first guide rail that extends vertically through the elevator shaft, wherein the elevator containment slot further includes: a first containment slot guide beam configured to align with the first guide beam.

In addition to one or more of the features described herein, or as an alternative, further embodiments may include a second guide beam that extends vertically through the elevator shaft, the second guide beam including a first surface of the second guide beam and a second surface of the second guide beam opposite the first surface of the second guide beam, wherein the beam climber system further includes: a second wheel in contact with the second surface of the first guide beam; a third wheel in contact with the first surface of the second guide beam; and a second electric motor configured to rotate the third wheel.

In addition to one or more of the features described herein, or as an alternative, further embodiments may include that the elevator containment slot further includes: a second containment slot guide beam configured to align with the second guide beam.

In addition to one or more of the features described herein, or as an alternative, further embodiments may include a second guide beam that extends vertically through the elevator shaft, the second guide beam including a first surface of the second guide beam and a second surface of the second guide beam opposite the first surface of the second guide beam, wherein the beam climber system further includes: a second wheel in contact with the second surface of the first guide beam; a third wheel in contact with the first surface of the second guide beam; and a second electric motor configured to rotate the third wheel.

In addition to one or more of the features described herein, or as an alternative, further embodiments may include that the elevator containment slot further includes: a second containment slot guide beam configured to align with the second guide beam.

In addition to one or more of the features described herein, or as an alternative, further embodiments may include a second guide rail that extends vertically through the elevator shaft, wherein the elevator containment slot further includes: a second containment slot guide beam configured to align with the second guide beam.

In addition to one or more of the features described herein, or as an alternative, further embodiments may include that the robotic transporter is located on a truck configured to transport the elevator car from a factory to a building where the elevator shaft is located or from the building to the factory.

According to another embodiment, a method of moving an elevator car from an elevator shaft to a parking area is outside of the elevator shaft, the method including: moving a robotic transporter to an elevator shaft to pick up the elevator car; aligning an elevator car containment slot within the robotic transporter with the elevator shaft; moving, using a propulsion system, the elevator car from the elevator shaft into the elevator car containment slot; and moving the robotic transporter with the elevator car within the elevator containment slot to a location within the parking area.

In addition to one or more of the features described herein, or as an alternative, further embodiments may include that the moving, using the propulsion system, the elevator car from the elevator shaft into the elevator car containment slot further includes: rotating, using a first electric motor of a beam climber system, a first wheel, the first wheel being in contact with a first surface of a first guide beam that extends vertically through the elevator shaft.

In addition to one or more of the features described herein, or as an alternative, further embodiments may include aligning a first containment slot guide beam of the elevator car containment slot with the first guide beam.

In addition to one or more of the features described herein, or as an alternative, further embodiments may include aligning a first containment slot guide rail of the elevator car containment slot with a first guide rail that extends vertically through the elevator shaft.

In addition to one or more of the features described herein, or as an alternative, further embodiments may include that the moving, using the propulsion system, the elevator car from the elevator shaft into the elevator car containment slot further includes: rotating a second wheel, the second wheel being in contact with the second surface of the first guide beam that extends vertically through the elevator shaft; and rotating, using a second electric motor of the beam climber system, a third wheel, the third wheel being in contact with a first surface of a second guide beam that extends vertically through the elevator shaft.

In addition to one or more of the features described herein, or as an alternative, further embodiments may include aligning a second containment slot guide beam of the elevator car containment slot with the second guide beam.

In addition to one or more of the features described herein, or as an alternative, further embodiments may include aligning a second containment slot guide rail of the elevator car containment slot with a second guide rail that extends vertically through the elevator shaft.

According to another embodiment, a computer program product embodied on a non-transitory computer readable medium, the computer program product including instructions that, when executed by a processor, cause the processor to perform operations including: moving a robotic transporter to an elevator shaft to pick up the elevator car; aligning an elevator car containment slot within the robotic transporter with the elevator shaft; moving, using a propulsion system, the elevator car from the elevator shaft into the elevator car containment slot; and moving the robotic transporter with the elevator car within the elevator containment slot to a location within the parking area.

Technical effects of embodiments of the present disclosure include using a robotic transporter to move an elevator car from an elevator shaft to a parking area that is outside of the elevator shaft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
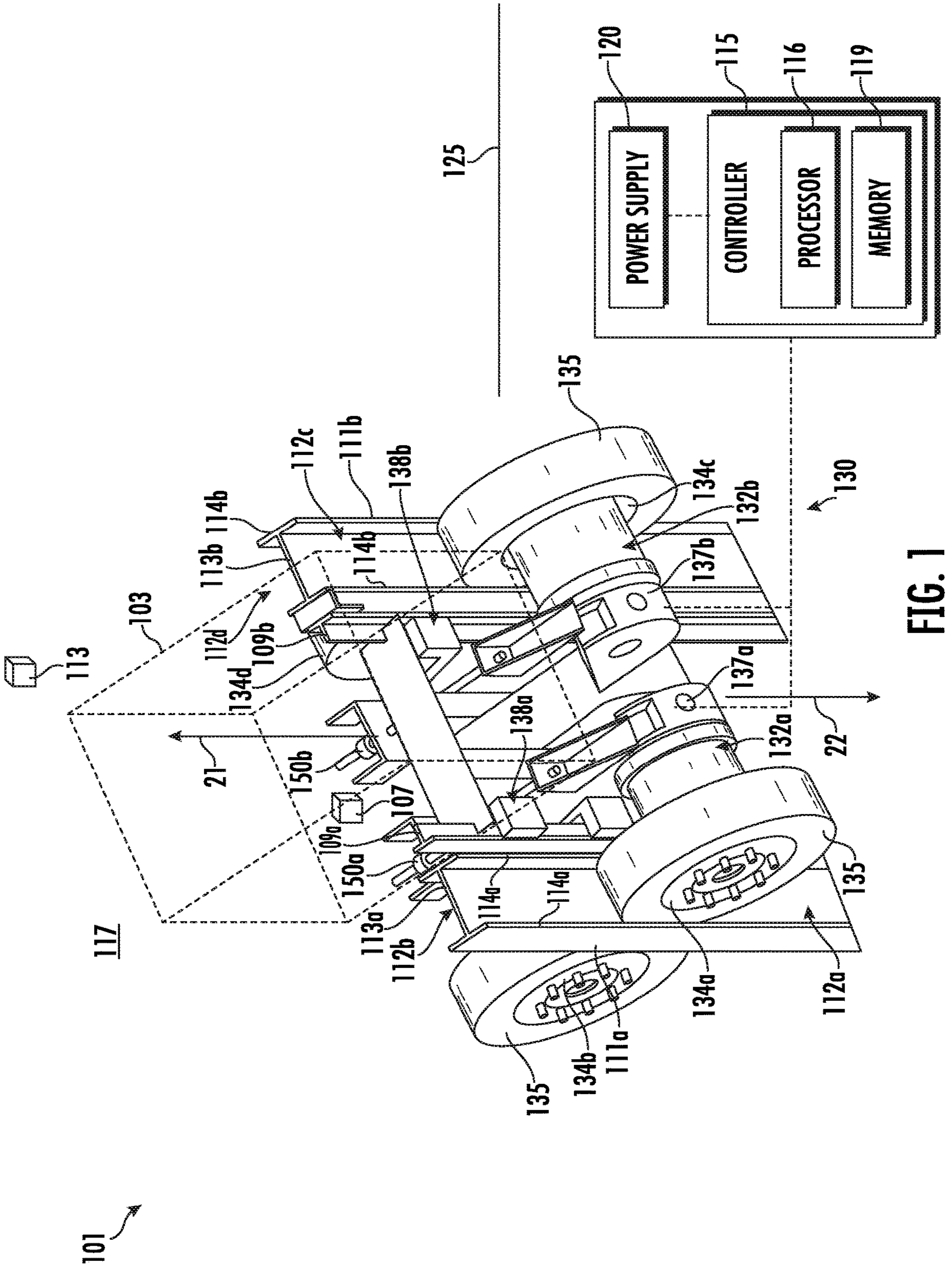
FIG. 1 is a schematic illustration of an elevator system with a beam climber system, in accordance with an embodiment of the disclosure.

FIG. 1 is a perspective view of an elevator system 101 including an elevator car 103, a beam climber system 130, a controller 115, and a power source 120. Although illustrated in FIG. 1 as separate from the beam climber system 130, the embodiments described herein may be applicable to a controller 115 included in the beam climber system 130 (i.e., moving through an elevator shaft 117 with the beam climber system 130) and may also be applicable to a controller located off of the beam climber system 130 (i.e., remotely connected to the beam climber system 130 and stationary relative to the beam climber system 130). Although illustrated in FIG. 1 as separate from the beam climber system 130, the embodiments described herein may be applicable to a power source 120 included in the beam climber system 130 (i.e., moving through the elevator shaft 117 with the beam climber system 130) and may also be applicable to a power source located off of the beam climber system 130 (i.e., remotely connected to the beam climber system 130 and stationary relative to the beam climber system 130).

The beam climber system 130 is configured to move the elevator car 103 within the elevator shaft 117 and along guide rails 109*a*, 109*b* that extend vertically through the elevator shaft 117. In an embodiment, the guide rails 109*a*, 109*b* are T-beams. The beam climber system 130 includes one or more electric motors 132*a*, 132*b*. The electric motors 132*a*, 132*b* are configured to move the beam climber system 130 within the elevator shaft 117 by rotating one or more wheels 134*a*, 134*b* that are pressed against a guide beam 111*a*, 111*b*. In an embodiment, the guide beams 111*a*, 111*b* are I-beams. It is understood that while an I-beam is illustrated, any beam or similar structure may be utilized with the embodiment described herein. Friction between the wheels 134*a*, 134*b*, 134*c*, 134*d* driven by the electric motors 132*a*, 132*b* allows the wheels 134*a*, 134*b*, 134*c*, 134*d* to climb up 21 and down 22 the guide beams 111*a*, 111*b*. The guide beam extends vertically through the elevator shaft 117. It is understood that while two guide beams 111*a*, 111*b* are illustrated, the embodiments disclosed herein may be utilized with one or more guide beams. It is also understood that while two electric motors 132*a*, 132*b* are illustrated, the embodiments disclosed herein may be applicable to beam climber systems 130 having one or more electric motors. For example, the beam climber system 130 may have one electric motor for each of the four wheels 134*a*, 134*b*, 134*c*, 134*d*. The electrical motors 132*a*, 132*b* may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 103).

The first guide beam 111*a* includes a web portion 113*a* and two flange portions 114*a*. The web portion 113*a* of the first guide beam 111*a* includes a first surface 112*a* and a second surface 112*b* opposite the first surface 112*a*. A first wheel 134*a* is in contact with the first surface 112*a* and a second wheel 134*b* is in contact with the second surface 112*b*. The first wheel 134*a* may be in contact with the first surface 112*a* through a tire 135 and the second wheel 134*b* may be in contact with the second surface 112*b* through a tire 135. The first wheel 134*a* is compressed against the first surface 112*a* of the first guide beam 111*a* by a first compression mechanism 150*a* and the second wheel 134*b* is compressed against the second surface 112*b* of the first guide beam 111*a* by the first compression mechanism 150*a*. The first compression mechanism 150*a* compresses the first wheel 134*a* and the second wheel 134*b* together to clamp onto the web portion 113*a* of the first guide beam 111*a*. The first compression mechanism 150*a* may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method. The first compression mechanism 150*a* may be adjustable in real-time during operation of the elevator system 101 to control compression of the first wheel 134*a* and the second wheel 134*b* on the first guide beam

111*a*. The first wheel 134*a* and the second wheel 134*b* may each include a tire 135 to increase traction with the first guide beam 111*a*.

The first surface 112*a* and the second surface 112*b* extend vertically through the shaft 117, thus creating a track for the first wheel 134*a* and the second wheel 134*b* to ride on. The flange portions 114*a* may work as guardrails to help guide the wheels 134*a*, 134*b* along this track and thus help prevent the wheels 134*a*, 134*b* from running off track.

The first electric motor 132*a* is configured to rotate the first wheel 134*a* to climb up 21 or down 22 the first guide beam 111*a*. The first electric motor 132*a* may also include a first motor brake 137*a* to slow and stop rotation of the first electric motor 132*a*. The first motor brake 137*a* may be mechanically connected to the first electric motor 132*a*. The first motor brake 137*a* may be a clutch system, a disc brake system, a drum brake system, a brake on a rotor of the first electric motor 132*a*, an electronic braking, an Eddy current brakes, a Magnetorheological fluid brake or any other known braking system. The beam climber system 130 may also include a first guide rail brake 138*a* operably connected to the first guide rail 109*a*. The first guide rail brake 138*a* is configured to slow movement of the beam climber system 130 by clamping onto the first guide rail 109*a*. The first guide rail brake 138*a* may be a caliper brake acting on the first guide rail 109*a* on the beam climber system 130, or caliper brakes acting on the first guide rail 109 proximate the elevator car 103.

The second guide beam 111*b* includes a web portion 113*b* and two flange portions 114*b*. The web portion 113*b* of the second guide beam 111*b* includes a first surface 112*c* and a second surface 112*d* opposite the first surface 112*c*. A third wheel 134*c* is in contact with the first surface 112*c* and a fourth wheel 134*d* is in contact with the second surface 112*d*. The third wheel 134*c* may be in contact with the first surface 112*c* through a tire 135 and the fourth wheel 134*d* may be in contact with the second surface 112*d* through a tire 135. A third wheel 134*c* is compressed against the first surface 112*c* of the second guide beam 111*b* by a second compression mechanism 150*b* and a fourth wheel 134*d* is compressed against the second surface 112*d* of the second guide beam 111*b* by the second compression mechanism 150*b*. The second compression mechanism 150*b* compresses the third wheel 134*c* and the fourth wheel 134*d* together to clamp onto the web portion 113*b* of the second guide beam 111*b*. The second compression mechanism 150*b* may be a spring mechanism, turnbuckle mechanism, an actuator mechanism, a spring system, a hydraulic cylinder, and/or a motorized spring setup. The second compression mechanism 150*b* may be adjustable in real-time during operation of the elevator system 101 to control compression of the third wheel 134*c* and the fourth wheel 134*d* on the second guide beam 111*b*. The third wheel 134*c* and the fourth wheel 134*d* may each include a tire 135 to increase traction with the second guide beam 111*b*.

The first surface 112*c* and the second surface 112*d* extend vertically through the shaft 117, thus creating a track for the third wheel 134*c* and the fourth wheel 134*d* to ride on. The flange portions 114*b* may work as guardrails to help guide the wheels 134*c*, 134*d* along this track and thus help prevent the wheels 134*c*, 134*d* from running off track.

The second electric motor 132*b* is configured to rotate the third wheel 134*c* to climb up 21 or down 22 the second guide beam 111*b*. The second electric motor 132*b* may also include a second motor brake 137*b* to slow and stop rotation of the second motor 132*b*. The second motor brake 137*b* may be mechanically connected to the second motor 132*b*. The second motor brake 137*b* may be a clutch system, a disc brake system, drum brake system, a brake on a rotor of the second electric motor 132*b*, an electronic braking, an Eddy current brake, a Magnetorheological fluid brake, or any other known braking system. The beam climber system 130 includes a second guide rail brake 138*b* operably connected to the second guide rail 109*b*. The second guide rail brake 138*b* is configured to slow movement of the beam climber system 130 by clamping onto the second guide rail 109*b*. The second guide rail brake 138*b* may be a caliper brake acting on the first guide rail 109*a* on the beam climber system 130, or caliper brakes acting on the first guide rail 109*a* proximate the elevator car 103.

The elevator system 101 may also include a position reference system 113. The position reference system 113 may be mounted on a fixed part at the top of the elevator shaft 117, such as on a support or guide rail 109, and may be configured to provide position signals related to a position of the elevator car 103 within the elevator shaft 117. In other embodiments, the position reference system 113 may be directly mounted to a moving component of the elevator system (e.g., the elevator car 103 or the beam climber system 130), or may be located in other positions and/or configurations as known in the art. The position reference system 113 can be any device or mechanism for monitoring a position of an elevator car within the elevator shaft 117, as known in the art. For example, without limitation, the position reference system 113 can be an encoder, sensor, accelerometer, altimeter, pressure sensor, range finder, or other system and can include velocity sensing, absolute position sensing, etc., as will be appreciated by those of skill in the art.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 103 and the beam climber system 130. For example, the controller 115 may provide drive signals to the beam climber system 130 to control the acceleration, deceleration, leveling, stopping, etc. of the elevator car 103.

The controller 115 may also be configured to receive position signals from the position reference system 113 or any other desired position reference device.

When moving up 21 or down 22 within the elevator shaft 117 along the guide rails 109*a*, 109*b*, the elevator car 103 may stop at one or more landings 125 as controlled by the controller 115. In one embodiment, the controller 115 may be located remotely or in the cloud. In another embodiment, the controller 115 may be located on the beam climber system 130. In embodiment, the controller 115 controls on-board motion control of the beam climber system 115 (e.g., a supervisory function above the individual motor controllers).

The power supply 120 for the elevator system 101 may be any power source, including a power grid and/or battery power which, in combination with other components, is supplied to the beam climber system 130. In one embodiment, power source 120 may be located on the beam climber system 130. In an embodiment, the power supply 120 is a battery that is included in the beam climber system 130.

The elevator system 101 may also include an accelerometer 107 attached to the elevator car 103 or the beam climber system 130. The accelerometer 107 is configured to detect an acceleration and/or a speed of the elevator car 103 and the beam climber system 130.

It is understood that while a beam climber system 130 is illustrated herein for exemplary discussion, the embodiments disclosed herein may be applicable to other self-propelled elevator systems, such as, for example, a permanent magnet linear motor propulsion system.

Figure 2A:
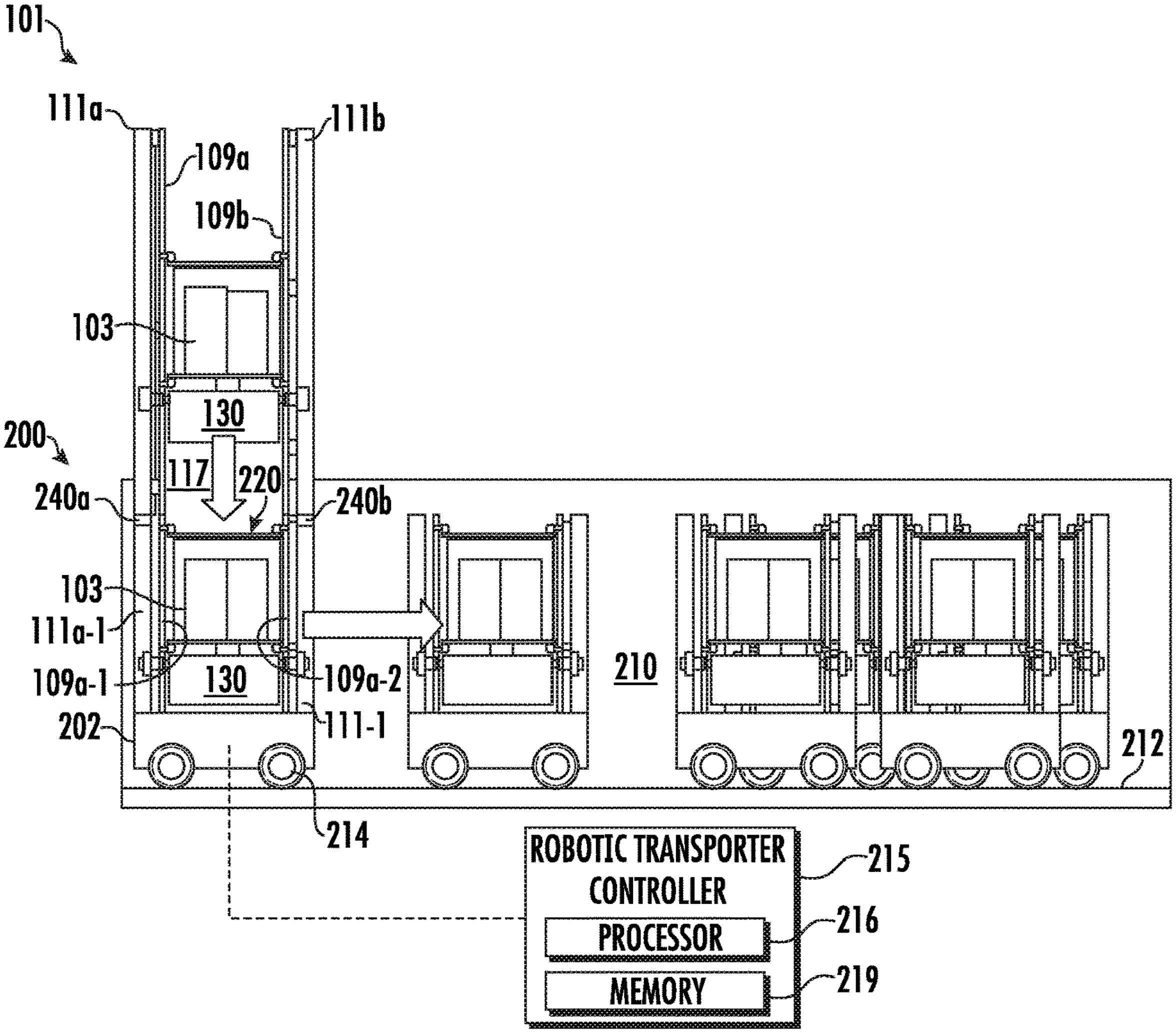
FIG. 2A illustrates a robotic transporter system, in accordance with an embodiment of the disclosure.
Figure 2B:
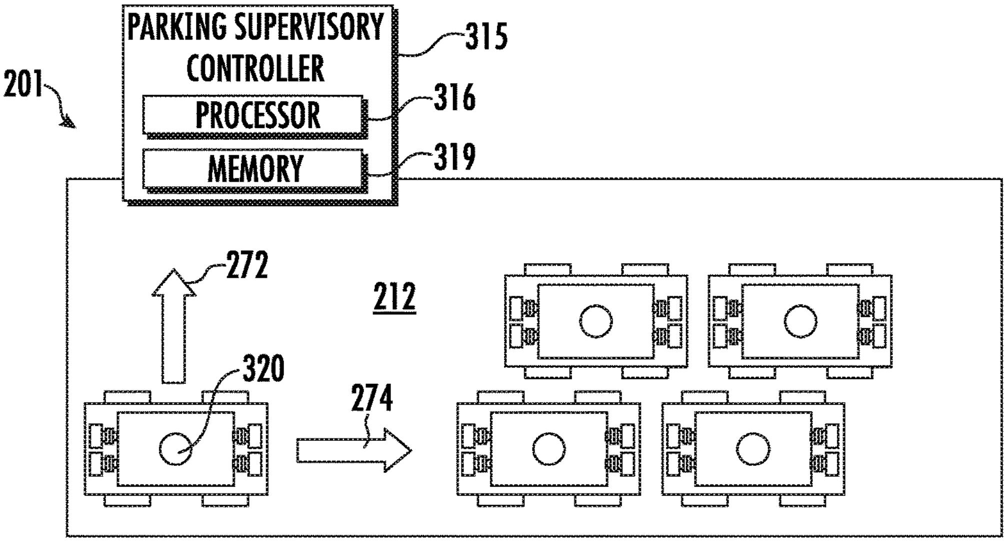
FIG. 2B illustrates a robotic transporter system, in accordance with an embodiment of the disclosure.

Referring now to FIGS. 2A and 2B with continued reference to FIG. 1, a robotic transporter system 200 is illustrated, in accordance with an embodiment of the present disclosure. FIG. 2A is a side view of the elevator system 101 and the robotic transporter system 200 and FIG. 2B is a top view of the parking area 210 of the robotic transporter system 200. The robotic transporter system 200 comprises one or more robotic transporters 202. The robotic transporter 202 may be a motorized and automated cart, such as, for example, an automated robotic vehicle (ARV). The robotic transporter 202 may move along the ground 212 of a parking area 210. The robotic transporter 202 may include a propulsive device (not shown for simplicity) to move along the ground 212. The propulsive device may be an electric motor and associated wheels 214. Alternatively, the robotic transporter 202 may levitate rather than have wheels. In an embodiment, the robotic transporter 202 is positioned beneath the elevator system 101, as illustrated in FIGS. 2A and 2B. Alternatively, the robotic transporter 202 may be positioned above the elevator system 101. The robotic transporter 202 includes one or more elevator car containment slots 220 configured to receive and hold/secure the elevator car 103 and the beam climber system 130. The elevator car containment slot 220 may include a restraint or locking mechanism (not shown for simplicity) to ensure that the elevator car 103 and the beam climber system 130 do not move during transportation by the robotic transporter 202

The robotic transporter 202 is configured to move an elevator car 103 from beneath (or above) the elevator shaft 117 to anywhere in the parking area 210. The robotic transporter 202 may configured to move along an X-axis 272 and a Y-axis 274 perpendicular to the X-axis 272. The wheels 214 of the robotic transporter 202 may be omni wheels that allow movement in along both the X-axis 272 and a Y-axis 274. It is understood that the robotic transporter 202 is not limited to omni wheels and the embodiments disclosed herein are applicable to robotic transporters having different propulsion apparatuses or structure.

The robotic transporter 202 is configured to align an elevator car containment slot 220 with an elevator shaft 117 to receive an elevator car 103 and beam climber system 130. For example, the robotic transporter 202 may align a first elevator car containment slot 220*a* with a first elevator shaft 117*a* to receive the elevator car 103 and the beam climber system 130. The elevator car containment slot 220 may include a first containment slot guide beam 111*a*-1 and a second containment slot guide beam 111*b*-1.

The first containment slot guide beam 111*a*-1 is configured to align with the first guide beam 111*a* so that the wheels 134*a*, 134*b* (see FIG. 1) may roll from the first guide beam 111*a* to the first containment slot guide beam 111*a*-1 when the beam climber system 130 is leaving the elevator shaft 117 and entering the elevator car containment slot 220 to ride the robotic transporter 202. The robotic transporter 202 may include a first sensor 240*a* configured to detect when the first containment slot guide beam 111*a*-1 is aligned with the first guide beam 111*a*. It is understood that the robotic transporter 202 may include other sensors including but not limited to micro-switches, gap sensors, vane sensors, load cells, strain gauges or broken beam sensors.

The second slot containment guide beam 111*b*-1 is configured to align with the second guide beam 111*b* so that the wheels 134*c*, 134*d* (see FIG. 1) may roll from the second guide beam 111*b* to the second slot containment guide beam 111*b*-1 when the beam climber system 130 is leaving the elevator shaft 117 and entering the elevator car containment slot 220 to ride the robotic transporter 202. The robotic transporter 202 may include a second sensor 240*b* configured to detect when the second containment slot guide beam 111*b*-1 is aligned with the second guide beam 111*b*.

The first containment slot guide rail 109*a*-1 is configured to align with the first guide rail 109*a*. The first sensor 240*a* may be configured to detect when the first containment slot guide rail 109*a*-1 is aligned with the first guide rail 109*a*.

The second slot containment guide rail 109*b*-1 is configured to align with the second guide rail 109*b*. The robotic transporter 202 may include a second sensor 240*b* configured to detect when the second containment slot guide rail 109*b*-1 is aligned with the second guide rail 109*b*.

It is understood that while FIG. 2A illustrates the robotic transporter 202 as including two sensors 240*a*, 240*b*, the robotic transporter system 200 may include any number of sensors (i.e., one or more sensors) to ensure alignment of the first containment slot guide beam 111*a*-1 with the first guide beam 111*a*, the second slot containment guide beam 111*b*-1 with the second guide beam 111*b*, the first containment slot guide rail 109*a*-1 with the first guide rail 109*a*, and the second slot containment guide rail 109*b*-1 with the second guide rail 109*b*.

The sensors 240*a*, 240*b* are configured to communicate alignment to the controller 115 (see FIG. 1) of the beam climber system 130, so that the beam climber system 130 may move itself and the elevator car 103 into an elevator car containment slot 220 of the robotic transporter 202. The sensors 240*a*, 240*b* are also configured to communicate misalignment to the controller 115 (see FIG. 1) of the beam climber system 130 to prevent the beam climber system 130 from attempting to move itself and the elevator car 103 into an elevator car containment slot 220 of the robotic transporter 202 that is not misaligned.

The sensors 240*a*, 240*b* are configured to communicate alignment or misalignment to a robotic transporter controller 215 of the robotic transporter 202. The robotic transporter controller 215 is configured to control operations of the robotic transporter 202. By reporting misalignment to the robotic transporter controller 215, the robotic transporter controller 215 may then take action to achieve alignment, such as moving forward or backward. By reporting alignment to the robotic transporter controller 215, the robotic transporter controller 215 may no longer need to move the robotic transporter 202 until the elevator car 103 and the beam climber system 130 move from the elevator shaft into the elevator car containment slot 220 of the robotic transporter 202.

The robotic transporter controller 215 may be an electronic controller including a processor 216 and an associated memory 219 comprising computer-executable instructions that, when executed by the processor 216, cause the processor 216 to perform various operations. The processor 216 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 219 may be but is not limited to a random access memory (RAM), read only memory (ROM), or other electronic, optical, magnetic or any other computer readable medium.

The robotic transporter system 200 also includes a parking supervisory controller 315. The parking supervisory controller 315 may be in communication with the robotic transporter controller 215 of each robotic transporter 202. The parking supervisory controller 315 is configured to detect a location of each robotic transporter 202 using a location sensor 320 attached to the robotic transporter 202. The parking supervisory controller 315 is configured to coordinate the movement of each of the robotic transporters 202 within the parking area 210.

The parking supervisory controller 315 may be an electronic controller including a processor 316 and an associated memory 319 comprising computer-executable instructions that, when executed by the processor 316, cause the processor 316 to perform various operations. The processor 316 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 319 may be but is not limited to a random access memory (RAM), read only memory (ROM), or other electronic, optical, magnetic or any other computer readable medium.

Although illustrated in FIG. 2A as separate from the robotic transporter 202, the embodiments described herein may be applicable to a robotic transporter controller 215 located in the robotic transporter 202 (i.e., moving with the robotic transporter 202) or located in a cloud computing network.

Figure 3:
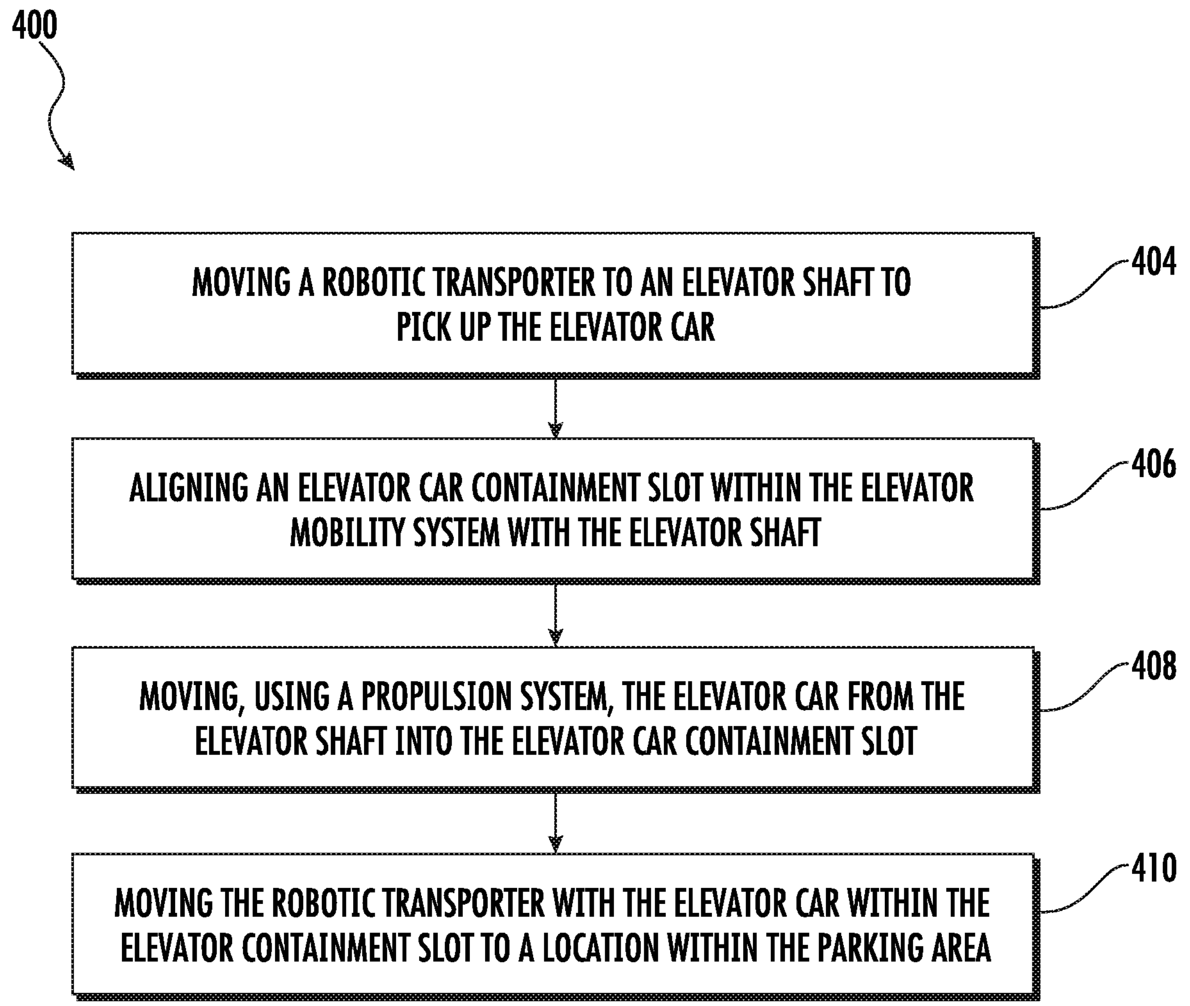
FIG. 3 is a flow chart of a method of moving an elevator car from an elevator shaft to a parking area, in accordance with an embodiment of the disclosure.

Referring now to FIG. 3, with continued reference to the previous FIGS., a flow chart of a method 400 of moving an elevator car 103 from an elevator shaft 117 to a parking area 210 that is outside of the elevator shaft 117 is illustrated, in accordance with an embodiment of the disclosure.

At block 404, a robotic transporter 202 is moved to an elevator shaft 117 to pick up the elevator car 103. At block 406, an elevator car containment slot 220 within the robotic transporter 202 is aligned with an elevator shaft 117.

At block 408, a propulsion system moves the elevator car 103 from the elevator shaft 117 into the elevator car containment slot 220. In an embodiment, the propulsion system is a beam climber system 130 and the elevator car 103 may be moved by rotating, using a first electric motor 132 of a beam climber system 130, a first wheel 134*a*. The first wheel 134*a* being in contact with a first surface 112*a* of a first guide beam 111*a* that extends vertically through the elevator shaft 117.

At block 410 the robotic transporter 202 is moved with the elevator car 103 within the elevator containment slot 220 to a location within the parking area 210. The location may be determined by the parking supervisory controller 315. The parking supervisory controller 315 may periodically or sporadically reorganize the parking area 210, thus requiring the robotic transporters 202 to move around within the parking area 210.

The method 400 may also comprise aligning a first containment slot guide beam 111*a*-1 of the elevator car containment slot 220 with the first guide beam 111*a*. The method 400 may further comprise aligning a first containment slot guide rail 109*a*-1 of the elevator car containment slot 220 with a first guide rail 109*a* that extends vertically through the elevator shaft 117.

The elevator car 103 may also be moved by rotating, using a second electric motor 132*b* of the beam climber system 130, a third wheel 134*c*, the third wheel being in contact with a first surface 112*c* of a second guide beam 111*b* that extends vertically through the elevator shaft 117.

The method 400 may also comprise aligning a second containment slot guide beam 111*b*-1 of the elevator car containment slot 220 with the second guide beam 111*b*. The method 400 may further comprise aligning a second containment slot guide rail 109*b*-1 of the elevator car containment slot 220 with a second guide rail 109*b* that extends vertically through the elevator shaft 117.

Additionally, the robotic transporter system 200 can be used to introduce additional elevator cars 103 during busy times, remove elevator cars 103 during slow times, remove elevator cars 103 for service, introduce elevator cars 103 that have been modernized and remove older elevator cars. In one embodiment, the robotic transporter 202 is located on a truck configured to transport elevator cars 103 from a factory to a building where the elevator shaft 117 is located or from the building to the factory.

While the above description has described the flow process of FIG. 3 in a particular order, it should be appreciated that unless otherwise specifically required in the attached claims that the ordering of the steps may be varied.

The present invention may be a system, a method, and/or a computer program product at any possible technical detail level of integration. The computer program product may include a computer readable storage medium (or media) having computer readable program instructions thereon for causing a processor to carry out aspects of the present invention.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A robotic transporter system for elevator cars, the robotic transporter system comprising:

a first guide beam comprising a first surface and a second surface opposite the first surface;

a propulsion system configured to move an elevator car through an elevator shaft, wherein the propulsion system is a beam climber system comprising:

a first wheel in contact with the first surface; and a first electric motor configured to rotate the first wheel; and a robotic transporter configured to move the elevator car within a parking area, the robotic transporter comprising:

an elevator containment slot to receive the elevator car and the propulsion system of the elevator car when the elevator containment slot is aligned with the elevator shaft;

wherein the elevator containment slot comprises a first containment slot guide beam configured to align with the first guide beam, wherein the first guide beam extends vertically through the elevator shaft, wherein the robotic transporter further comprises a first sensor configured to detect when the first containment slot guide beam is aligned with the first guide beam.

2. The robotic transporter system of claim 1, wherein the robotic transporter further comprises:

a propulsive system and wheels.

3. The robotic transporter system of claim 1, wherein the robotic transporter is configured to move along an X-axis and a Y-axis perpendicular to the X-axis.

4. The robotic transporter system of claim 1, further comprising:

a first guide rail that extends vertically through the elevator shaft.

5. The robotic transporter system of claim 1, further comprising:

a second guide beam that extends vertically through the elevator shaft, the second guide beam comprising a first surface of the second guide beam and a second surface of the second guide beam opposite the first surface of the second guide beam, wherein the beam climber system further comprises:

a second wheel in contact with the second surface of the first guide beam;

a third wheel in contact with the first surface of the second guide beam; and a second electric motor configured to rotate the third wheel.

6. The robotic transporter system of claim 5, wherein the elevator containment slot further comprises:

a second containment slot guide beam configured to align with the second guide beam.

7. The robotic transporter system of claim 4, further comprising:

a second guide beam that extends vertically through the elevator shaft, the second guide beam comprising a first surface of the second guide beam and a second surface of the second guide beam opposite the first surface of the second guide beam, wherein the beam climber system further comprises:

a second wheel in contact with the second surface of the first guide beam;

a third wheel in contact with the first surface of the second guide beam; and a second electric motor configured to rotate the third wheel.

8. The robotic transporter system of claim 7, wherein the elevator containment slot further comprises:

a second containment slot guide beam configured to align with the second guide beam.

9. The robotic transporter system of claim 7, further comprising:

a second guide rail that extends vertically through the elevator shaft, wherein the elevator containment slot further comprises:

a second containment slot guide beam configured to align with the second guide beam.

10. The robotic transporter system of claim 1, wherein the robotic transporter is located on a truck configured to transport the elevator car from a factory to a building where the elevator shaft is located or from the building to the factory.

11. A method of moving an elevator car from an elevator shaft to a parking area that is outside of the elevator shaft, the method comprising:

moving a robotic transporter to an elevator shaft to pick up the elevator car;

aligning an elevator car containment slot within the robotic transporter with the elevator shaft;

moving, using a propulsion system, the elevator car from the elevator shaft into the elevator car containment slot, wherein the moving comprises rotating, using a first electric motor of a beam climber system, a first wheel, the first wheel being in contact with a first surface of a first guide beam; and moving the robotic transporter with the elevator car within the elevator containment slot to a location within the parking area;

wherein the first guide beam extends vertically through the elevator shaft, wherein the robotic transporter further comprises a first sensor configured to detect when the first containment slot guide beam is aligned with the first guide beam.

12. The method of claim 11, further comprising:

aligning a first containment slot guide beam of the elevator car containment slot with the first guide beam.

13. The method of claim 12, further comprising:

aligning a first containment slot guide rail of the elevator car containment slot with a first guide rail that extends vertically through the elevator shaft.

14. The method of claim 11, wherein the moving, using the propulsion system, the elevator car from the elevator shaft into the elevator car containment slot further comprises:

rotating a second wheel, the second wheel being in contact with the second surface of the first guide beam that extends vertically through the elevator shaft; and rotating, using a second electric motor of the beam climber system, a third wheel, the third wheel being in contact with a first surface of a second guide beam that extends vertically through the elevator shaft.

15. The method of claim 14, further comprising:

aligning a second containment slot guide beam of the elevator car containment slot with the second guide beam.

16. The method of claim 15, further comprising:

aligning a second containment slot guide rail of the elevator car containment slot with a second guide rail that extends vertically through the elevator shaft.

17. A computer program product embodied on a non-transitory computer readable medium, the computer program product including instructions that, when executed by a processor, cause the processor to perform operations comprising:

moving a robotic transporter to an elevator shaft to pick up the elevator car;

aligning an elevator car containment slot within the robotic transporter with the elevator shaft;

moving, using a propulsion system, the elevator car from the elevator shaft into the elevator car containment slot; and moving the robotic transporter with the elevator car within the elevator containment slot to a location within the parking area;

rotating, using a first electric motor of a beam climber system, a first wheel, the first wheel being in contact with a first surface of the first guide beam;

moving the robotic transporter with the elevator car within the elevator containment slot to a location within the parking area, wherein the first guide beam extends vertically through the elevator shaft, wherein the robotic transporter further comprises a first sensor configured to detect when the first containment slot guide beam is aligned with the first guide beam.

* * * * *